United States Patent
Phely et al.

(10) Patent No.: US 8,567,463 B2
(45) Date of Patent: Oct. 29, 2013

(54) SEMI-HOLLOW PNEUMATIC TIRE AND ASSOCIATED WHEEL RIM, NOTABLY FOR AGRICULTURAL MACHINERY

(75) Inventors: Olivier Phely, Thenisy (FR); Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 0 days.

(21) Appl. No.: 13/617,546

(22) Filed: Sep. 14, 2012

(65) Prior Publication Data

US 2013/0009452 A1 Jan. 10, 2013

Related U.S. Application Data

(63) Continuation of application No. 12/482,565, filed on Jun. 11, 2009, now Pat. No. 8,297,325.

(30) Foreign Application Priority Data

Jul. 18, 2008 (FR) ...................................... 08 04107

(51) Int. Cl.
*B60C 3/02* (2006.01)
*B60B 21/02* (2006.01)

(52) U.S. Cl.
USPC .... 152/379.3; 152/453; 152/454; 301/95.105

(58) Field of Classification Search
USPC .......... 152/157, 327, 329, 379.3, 379.5, 453, 152/454, 539, 544, DIG. 20; 301/95.104, 301/95.105, 95.11
See application file for complete search history.

(56) References Cited

U.S. PATENT DOCUMENTS

| | | | |
|---|---|---|---|
| 472,411 A * | 4/1892 | Toney et al. .................. | 152/329 |
| 597,194 A | 1/1898 | Collins | |
| 884,702 A | 4/1908 | Bowden | |
| 1,057,398 A | 4/1913 | Allison | |
| 1,431,323 A | 10/1922 | Muszynski | |
| 1,900,835 A | 9/1933 | Haquelin | |
| 3,369,844 A | 2/1968 | Hamilton et al. | |
| 3,895,668 A | 7/1975 | Tangorra | |
| 6,431,235 B1 | 8/2002 | Steinke | |
| 2008/0230162 A1 | 9/2008 | Piou et al. | |
| 2009/0139624 A1 | 6/2009 | Liu | |

FOREIGN PATENT DOCUMENTS

| | | |
|---|---|---|
| DE | 32 17 946 A1 | 11/1983 |
| FR | 2 850 607 | 8/2004 |
| GB | 723745 A | 2/1955 |

* cited by examiner

*Primary Examiner* — Kip T Kotter
(74) *Attorney, Agent, or Firm* — Oblon, Spivak, McClelland, Maier & Neustadt, L.L.P.

(57) ABSTRACT

A pneumatic tire of the semi-hollow type includes a casing having an uninflated inner volume and including an inner wall provided with a retaining bead and a convex outer wall forming the tread of the tire, the inner wall and the outer wall of the tire being connected by two annular borders. The inner wall of the tire is concave so as to surmount a convex outer wall of the peripheral seat of a rim of a wheel, this outer wall being provided with a peripheral slot adapted to accommodate the retaining bead of the tire.

16 Claims, 2 Drawing Sheets

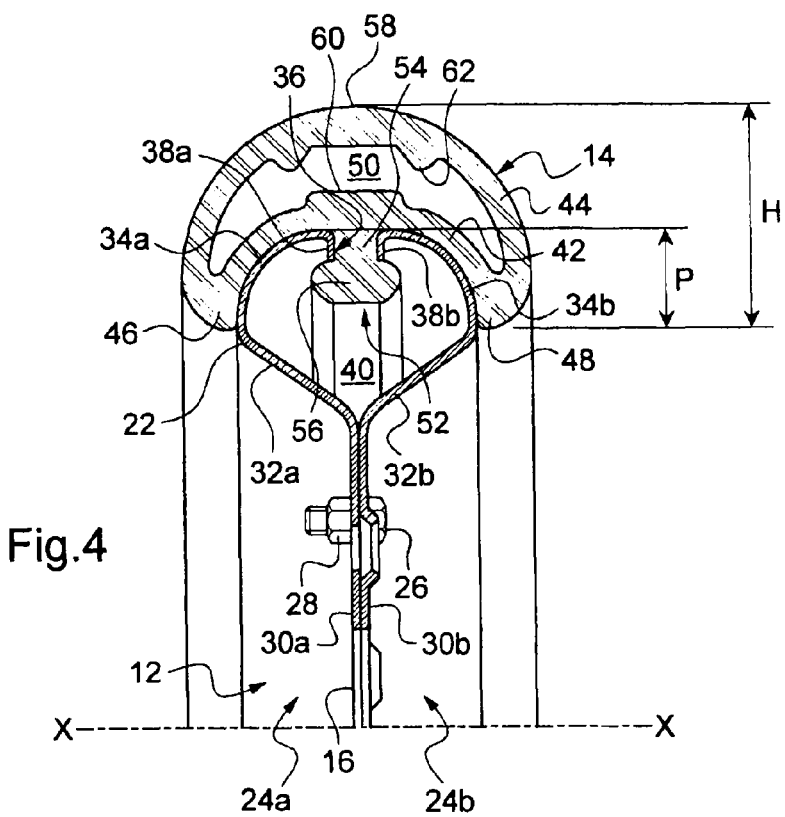
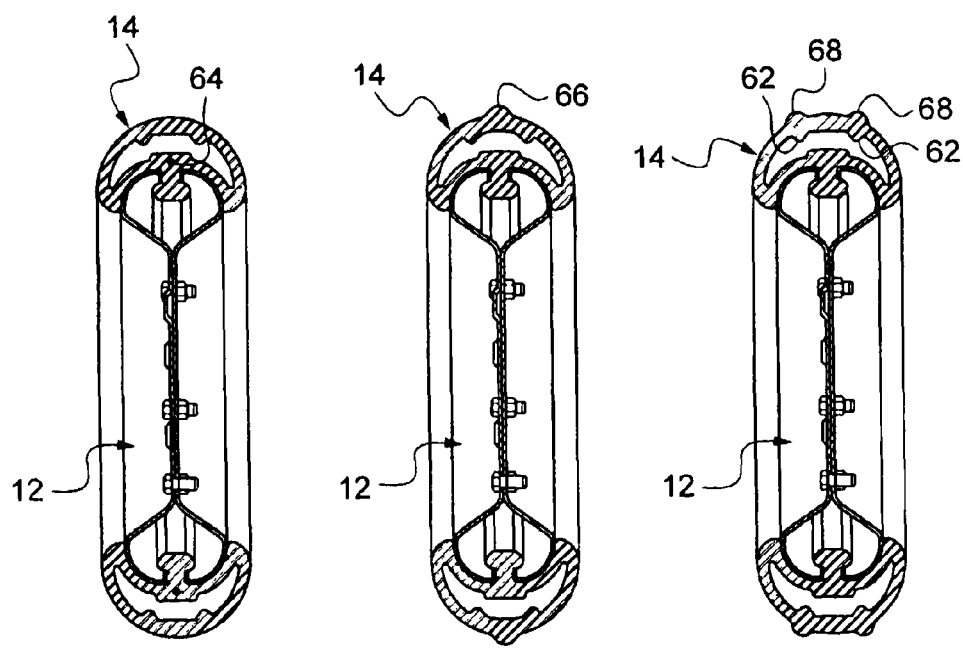
Fig.4
Fig.5  Fig.6  Fig.7

SEMI-HOLLOW PNEUMATIC TIRE AND ASSOCIATED WHEEL RIM, NOTABLY FOR AGRICULTURAL MACHINERY

CROSS-REFERENCE TO RELATED APPLICATIONS

This application is a continuation of U.S. application Ser. No. 12/482,565, filed Jun. 11, 2009, the entire content of which is incorporated herein by reference, and claims priority under 35 U.S.C. 119 to French Patent Application No. 08 04107 filed Jul. 18, 2008.

BACKGROUND

1. Field

The invention is concerned with the field of wheels and relates more particularly to a semi-hollow tire and an associated wheel rim, notably for agricultural machinery.

It relates chiefly, but not restrictively, to a wheel intended for a seed drill element for regulating the working depth of this element and/or for pressing the soil down after this element has passed by.

2. Description of the Related Art

In agricultural machinery of this type a ground working tool such as a ploughshare, a disc or a tooth creates a furrow in which the grains or seeds are buried, the furrow then being closed off to allow the grains or seeds to germinate.

These agricultural machines are drawn by a tractor and are generally of the trailed or semi-trailed type.

The wheel that is fitted to the seed drill serves primarily as a depth control wheel for controlling the working depth of the seed drill. However, it may also serve to press down the soil to close off the furrow in which the grains or seeds have been deposited.

In some machines, these wheels act only as a depth control wheel, while in others they act only as pressing wheels. However, these wheels may also perform a double function of depth control and pressing.

A wheel of this kind may be arranged in front of the tool or behind the tool relative to the direction of travel of the machine.

In every case, these wheels are subjected to difficult working conditions in view of the fact that the machine often moves forward at a speed of the order of 15 to 20 km/h on open fields, i.e. on irregular and sometimes bumpy terrain. They are also subject to considerable stresses, particularly when the machine is banking or performing half-turns.

Moreover, when the wheel travels over wet or sticky ground, wet soil is liable to stick to the wheel, preventing it from fulfilling its functions correctly.

The design of such wheels is therefore particularly tricky.

The most widely adopted solution is a wheel comprising a conventional inflated tire mounted about a conventional rim. For optimum operation, the tire must be inflated to the correct pressure, with the result that the tire thus obtained is prone to stresses and lack of flexibility. It therefore has a tendency to accumulate soil when it travels over wet ground.

Wheels are also known which are fitted with special tires, particularly of the semi-hollow type. Thus, the Applicant markets a wheel comprising a rim formed by a hub surrounded by a peripheral seat having a peripheral slot, as well as a tire of the semi-hollow type comprising a casing having an uninflated inner volume, said casing comprising an inner wall adapted to surround the peripheral seat and provided with a retaining bead adapted to engage in the peripheral slot, as well as a convex outer wall forming the tread of the tire.

The outer wall of the rim is generally cylindrical, as is the inner wall of the casing.

The wheel in this second solution is generally satisfactory, but there is a need to improve performance still further, notably for travelling over difficult terrain, such as sloping or banked terrain or wet and sticky ground.

The invention sets out in particular to provide a solution to this problem.

SUMMARY

In a first aspect, the invention relates to a pneumatic tire of the semi-hollow type, intended for a wheel rim formed by a hub surrounded by a peripheral seat having an outer wall provided with a peripheral slot, the tire comprising a casing having an uninflated inner volume, said casing comprising an inner wall which is adapted to surround the outer wall of the peripheral seat and which is provided with a retaining bead adapted to be received in the peripheral slot in the peripheral seat, as well as a convex outer wall, i.e. a wall that is domed outwards, forming the tread of the tire.

According to the invention, the inner wall of the tire is concave, so as to surmount the convex outer wall of the peripheral seat, the inner wall and outer wall of the tire being connected by two annular borders adapted to cover the outer wall of the peripheral seat towards the hub.

On account of its particular configuration, the casing of the semi-hollow tire surmounts the convex, i.e. outwardly domed, shape of the outer wall of the peripheral seat of the rim, thereby enveloping the peripheral seat and extending in the direction of the hub of the wheel rim.

This enveloping structure allows a better shape adaptation between the casing of the tire and the peripheral seat of the rim, thus allowing improved characteristics and better performance of this tire especially in difficult conditions, for example on banked terrain, slippery terrain, etc.

Moreover, this particular shape of semi-hollow tire gives it greater flexibility, which assists with its self-cleaning when the tire is travelling over wet and sticky ground.

In another aspect, the invention relates to a wheel rim suitable for being associated with a semi-hollow tire as hereinbefore defined.

This wheel rim is formed by a hub surrounded by a peripheral seat provided with a peripheral slot, and this peripheral seat comprises an outwardly domed outer wall having a top part in which the peripheral slot is formed. This outer wall is adapted to receive the inner wall of a tire of the semi-hollow type as hereinbefore defined, wherein the retaining bead is adapted to be received in the peripheral slot in the peripheral seat.

The invention also relates to a wheel formed by a rim and a semi-hollow tire as hereinbefore defined.

BRIEF DESCRIPTION OF THE DRAWINGS

In the detailed description that follows, which is provided solely by way of example, reference is made to the attached drawings, wherein:

FIG. 4 shows a half-section from FIG. 2 on a larger scale;

FIG. 5 is a view analogous to FIG. 2 in an alternative embodiment in which a reinforcing framework is embedded in the inner wall of the casing; and FIGS. 6 and 7 are sectional views analogous to FIG. 2 in alternative embodiments in which the tread of the tire is provided with external reliefs.

DETAILED DESCRIPTION

Figure 1:
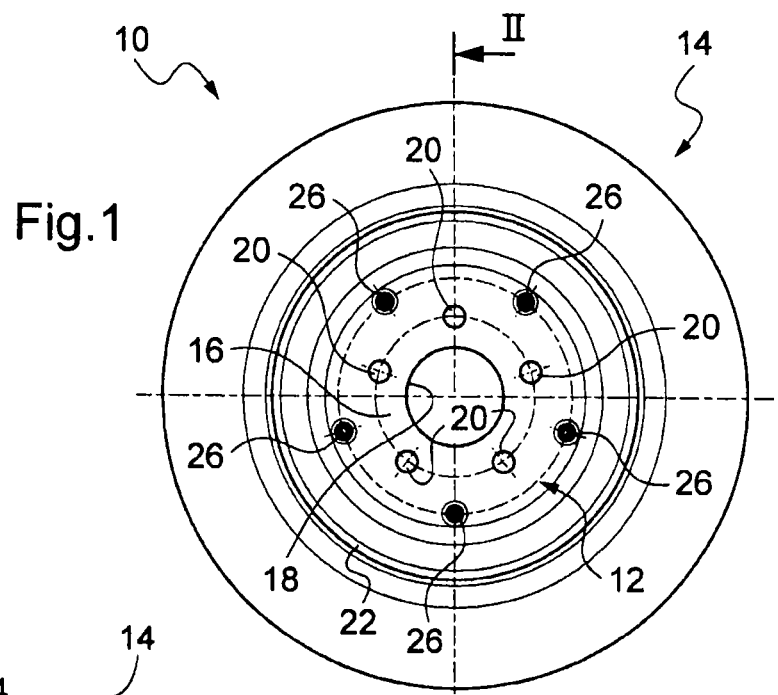
FIG. 1 is a front view of a wheel comprising a semi-hollow tire and a rim according to the invention.
Figure 2:
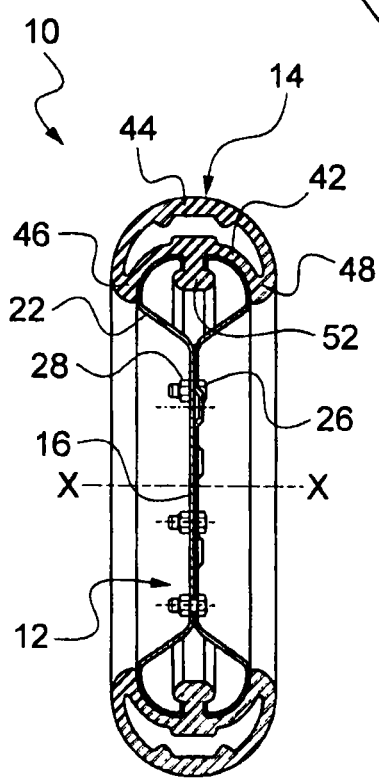
FIG. 2 is a section on the line II-II in FIG. 1.
Figure 3:
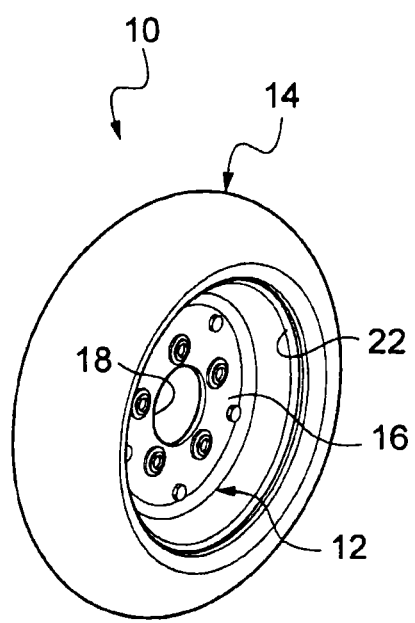
FIG. 3 is a perspective view of the wheel in FIGS. 1 and 2.

Reference will be made first of all to FIGS. 1 to 3 which show a wheel 10 for an agricultural machine comprising a rim 12 around which is mounted a pneumatic tire 14 of the semi-hollow type, also known as a "tire".

The rim 12 is formed by a hub 16 having a circular central opening 18 of axis XX and fixing holes 20, five in this example, serving for the mounting of the rim on an appropriate support (FIG. 1). The hub 16 is surrounded by an annular peripheral seat 22, also known as a "seating", around which is mounted the tire 14. The structure of the wheel 10 (rim 12 and tire 14) will be better understood from a study of FIGS. 2 and 4.

In the embodiment shown, the rim 12 is formed by two cheeks 24a and 24b which are joined to one another by five sets of bolts 26 and nuts 28. Each bolt 26 passes successively through a central part 30b of the cheek 24b and a central part 30a of the cheek 24a before being fitted with a nut 28 (FIG. 4).

The central parts 30a and 30b are continued respectively by inner walls 32a and 32b which widen radially outwards and are continued by outer walls 34a and 34b which converge on one another. These latter jointly constitute an outer wall of the peripheral seat 22 which has a convex, i.e. outwardly domed, radial cross-section. In the embodiment shown this cross-section is substantially semi-circular. In other words, each of the outer walls 34a and 34b has a cross-section substantially in the shape of a quarter-circle in the radial direction.

This outer wall has a top part which is interrupted so as to define a peripheral slot 36 which is delimited by two respective folded edges 38a and 38b facing one another, coming from the outer walls 34a and 34b of the peripheral seat. The outer walls 34a and 34b are thus connected to the central parts 30a and 30b by the inner walls 32a and 32b which become thinner towards the hub 16.

In the embodiment shown, the cheeks 24a and 24b are formed from a sheet metal, such as sheet steel, for example. However, in an alternative embodiment (not shown), the rim could be made in one piece. Moreover, the rim could be formed from a plastic material, whether in one or more pieces.

The cross-section of the peripheral seat 22 is hollow and delimits an annular chamber 40. The folded edges 38a and 38b are turned towards the inside of the chamber 40. The radial cross-section of the seat 22 is thus generally heart-shaped.

The semi-hollow tire 14 surmounts the outer wall 34a, 34b of the peripheral seat 22 by virtue of its particular shape. This tire has a casing made of an elastomeric material, e.g. rubber. This casing has an inner wall 42 which is concave in shape so as to surmount the outer wall 34a, 34b of the peripheral seat 22 of the rim. This inner wall 42 is connected to a convex outer wall 44 which constitutes the tread of the tire. The walls 42 and 44 are connected by two annular borders 46 and 48 which cover the outer wall of the peripheral seat in the direction of the hub.

The casing of the tire delimits an inner volume 50 which is not inflated and which communicates with the outside via at least one opening (not shown). The tire may be produced by a conventional method for manufacturing semi-hollow tires.

The inner wall 42 is provided with a retaining bead 52 which projects radially inwards and is adapted to engage in the peripheral slot 36 in order to hold the tire in position on the rim.

In the embodiment shown, the retaining bead 52, which is attached to the inner wall 42 of the casing, has a "mushroom"-shaped or "T"-shaped profile, with a narrow portion 54 attached to the inner wall 42 and an enlarged head 56 adapted to be accommodated in the inner chamber 40 of the peripheral seat.

Thus, the retaining bead 52 is held between the two cheeks 24a and 24b as they are fitted together.

In the case of a one-piece wheel, it is also possible to insert a retaining bead of this kind, but this necessitates radially widening the tire and force-fitting the bead into the slot delimited at the periphery of the seat in the rim.

The inner wall 42 has a substantially semi-circular cross-section and the same applies to the outer wall 44. Thus, the casing has a radial cross-section which is substantially crescent-shaped.

As can be seen from FIG. 4, the inner wall 42 has a radial depth P defined as the radial distance between the annular borders 46 and 48 and the bottom of the inner wall, i.e. the point where the retaining bead 52 is attached. The outer wall 44 has a radial height H defined as the radial distance between the annular borders 46 and 48 and the top part 58 of the outer wall. The ratio P/H between the radial depth and the radial height is at least 0.25, preferably between 0.25 and 0.50. In the embodiment, this ratio is 44.5%.

The presence of a ratio greater than 0.25 allows good cooperation of shape between the seat of the rim and the tire to ensure good mechanical characteristics.

In the embodiment shown in FIGS. 1 to 4, the outer wall 44 forming the tread is smooth on the outside but, as will be seen hereinafter, it may also be provided with external reliefs.

According to an interesting feature, the inner wall 42 and the outer wall 44 of the casing have complementary respective profiles arranged facing one another inside the casing and adapted to fit together mutually when the casing is compressed on the ground under the effect of a load.

In the embodiment shown, these complementary respective profiles comprise a central projection 60 protruding from the inner wall 42 and two lateral projections 62, spaced apart from each other, protruding from the outer wall 44 and adapted to house the central projection 60 between them when the casing is compressed on the ground.

In fact, as the tire is of the semi-hollow type, the casing has a tendency to be crushed naturally in contact with the ground, under the effect of the load. The central projection 60 is then received between the two lateral projections 62, thus preventing any lateral relative movement between the walls 42 and 44. This is particularly useful when the wheel is travelling over difficult terrain, for example over sloping land or banked land, as this allows the wheel to maintain its trajectory.

In the alternative embodiment shown in FIG. 5, a reinforcing framework 64 is embedded in the inner wall 42 of the casing close to the retaining bead 52. This framework which is advantageously a metal ring or a cable, enables the casing to be reinforced in the region of the peripheral bead, which is subjected to particular stress.

As already indicated, the outer wall 44 forming the tread may be provided with external reliefs. In the embodiment in FIG. 6, the outer wall 44 is surrounded by an outer central rib 66 which is arranged on the top part of the tread.

In the case of FIG. 7, this outer wall is provided with two mutually spaced outer lateral ribs 68. These two ribs 68 are arranged substantially in the region of the lateral projections 62 mentioned hereinbefore. Other types of reliefs may be envisaged, such as grippers, for example.

The invention applies in particular to wheels used in agriculture, notably depth control wheels and/or wheels for pressing on the ground.

The rim of the wheel may be made in one piece or in two pieces, either of metal or of plastics.

The domed shape of the outer wall of the rim may have a shape other than semi-circular, for example a shape with a double slope.

Equally, the shape of the tire is capable of numerous alternative embodiments provided that the inner wall thereof comes to be atop the seat of the rim and extends beyond this seat to extend towards the hub, forming an enveloping shape.

The tire is particularly flexible, giving an enhanced self-cleaning effect.

The tire according to the invention may also travel on the roads, provided that its speed does not exceed a limit of generally about 40 km/h.

What is claimed is:

1. A pneumatic tire for a wheel rim formed by a hub surrounded by a peripheral seat having an outer wall provided with a peripheral slot, the tire comprising:
    a casing having an uninflated inner volume, the casing including
        an inner wall which is adapted to surround the outer wall of the peripheral seat and which is provided with a retaining bead adapted to be received in the peripheral slot in the peripheral seat, and
        a convex outer wall forming a tread of the tire,
    wherein the inner wall of the casing is concave, so as to surmount the outer wall of the peripheral seat, the inner wall and the convex outer wall of the casing being connected by two annular borders adapted to cover the outer wall of the peripheral seat towards the hub,
    wherein the casing has a substantially crescent-shaped radial cross-section,
    wherein the inner wall of the casing has a substantially semi-circular cross-section, and
    wherein the inner wall has a radial depth (P) defined as a radial distance between the annular borders and a bottom of the inner wall, and the inner volume extends towards the annular borders into the radial depth portion of the inner wall.

2. The pneumatic tire according to claim 1, wherein the convex outer wall has a radial height (H) defined as a radial distance between the annular borders and a top part of the outer wall, and
    wherein a ratio (P/H) between the radial depth and the radial height being at least 0.25.

3. The pneumatic tire according to claim 2, wherein the ratio (P/H) between the radial depth and the radial height is between 0.25 and 0.50.

4. The pneumatic tire according to claim 1, wherein the retaining bead attached to the inner wall of the casing has a mushroom-shaped or T-shaped profile with a narrow portion attached to the inner wall and adapted to pass through the peripheral slot and a widened head adapted to be accommodated in an inner chamber of the rim delimited by the outer wall of the peripheral seat.

5. The pneumatic tire according to claim 1, further comprising a reinforcing framework embedded in the inner wall of the casing close to the retaining bead.

6. The pneumatic tire according to claim 1, wherein the inner wall and the convex outer wall of the casing have complementary profiles arranged facing one another inside the casing and adapted to fit mutually with each other when the casing is compressed on the ground under an effect of a load.

7. The pneumatic tire according to claim 6, wherein the complementary profiles comprise a central projection protruding from the inner wall and two spaced-apart lateral projections protruding from the outer wall and are adapted to house the central projection therebetween when the casing is compressed on the ground.

8. The pneumatic tire according to claim 1, wherein the convex outer wall of the casing forming the tread is generally smooth on an outside thereof.

9. The pneumatic tire according to claim 1, wherein the convex outer wall of the casing forming the tread is provided with external reliefs including at least one external annular rib.

10. A wheel rim formed by a hub surrounded by a peripheral seat provided with a peripheral slot, wherein the peripheral seat of the rim comprises an outwardly domed outer wall having a top part in which the peripheral slot is formed, the outer wall receiving the inner wall of the tire according to claim 1, the retaining bead being received in the peripheral slot in the peripheral seat.

11. The wheel rim according to claim 10, wherein the outer wall of the peripheral seat has a cross-section substantially in a shape of an arc of a circle interrupted to form the peripheral slot.

12. The wheel rim according to claim 10, wherein the peripheral slot is delimited by two folded edges facing one another, protruding from the outer wall of the peripheral seat of the rim and turned towards an inside of a chamber of the peripheral seat.

13. The wheel rim according to claim 10, wherein the outer wall of the peripheral seat is extended by an inner wall which becomes narrower towards the hub.

14. The wheel rim according to claim 10, wherein the rim is formed by the joining together of two cheeks which jointly delimit the peripheral slot.

15. A wheel comprising a pneumatic tire according to claim 1, mounted on said wheel rim.

16. The pneumatic tire according to claim 1, wherein the inner volume has a substantially crescent shaped cross section.

* * * * *